US009990673B2

(12) United States Patent
Kayser et al.

(10) Patent No.: US 9,990,673 B2
(45) Date of Patent: Jun. 5, 2018

(54) UNIVERSAL PAYMENT MODULE SYSTEMS AND METHODS FOR MOBILE COMPUTING DEVICES

(75) Inventors: Chris Kayser, Brightwaters, NY (US); Chris Ciervo, Brookhaven, NY (US); Jeff Weissman, South Setauket, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 1037 days.

(21) Appl. No.: 12/772,409

(22) Filed: May 3, 2010

(65) Prior Publication Data
US 2011/0270741 A1 Nov. 3, 2011

(51) Int. Cl.
*G06Q 40/00* (2012.01)
*G06Q 20/10* (2012.01)

(52) U.S. Cl.
CPC ............ *G06Q 40/00* (2013.01); *G06Q 20/10* (2013.01)

(58) Field of Classification Search
None
See application file for complete search history.

(56) References Cited

U.S. PATENT DOCUMENTS

| | | | |
|---|---|---|---|
| D339,807 S * | 9/1993 | Tattari et al. | D14/240 |
| 5,496,992 A | 3/1996 | Madan et al. | |
| 5,627,355 A * | 5/1997 | Rahman et al. | 235/380 |
| 5,669,069 A * | 9/1997 | Rautila | 455/558 |
| 5,999,624 A * | 12/1999 | Hopkins | G06Q 20/04 705/16 |
| 6,006,987 A * | 12/1999 | Hoolhorst | 235/375 |
| 6,026,166 A * | 2/2000 | LeBourgeois | 713/156 |
| 6,726,070 B2 | 4/2004 | Lautner | |
| 6,754,069 B2 | 6/2004 | Harada | |
| 6,917,299 B2 * | 7/2005 | Fu | G06F 21/86 340/3.3 |
| 7,016,709 B2 * | 3/2006 | Kortum | H01R 27/00 455/557 |
| 7,051,002 B2 * | 5/2006 | Keresman, III | G06Q 20/02 705/42 |
| 7,147,162 B2 | 12/2006 | Fitch et al. | |

(Continued)

FOREIGN PATENT DOCUMENTS

| | | |
|---|---|---|
| JP | 2002-117370 A | 4/2002 |
| JP | 2006-502471 A | 2/2004 |
| JP | 2009-282761 A | 12/2009 |

*Primary Examiner* — Chikaodinaka Ojiaku

(57) ABSTRACT

The present disclosure provides universal payment module systems and methods for mobile computing devices that include a universal payment module and an associated adapter device for coupling the universal payment module to any of a plurality of mobile computing devices. The present disclosure utilizes a common payment module which can interface multiple mobile computers with differing form factors via a snap-on sled. Advantageously, the present invention allows the leveraging of one payment module for many mobile computers. The single payment module includes various special payment security mechanisms via mechanical, electrical, and software mechanisms. The present disclosure enables design, standardization, and production of one single common, universal payment module for a plurality of mobile computer devices instead of one specific payment module for each form factor of the plurality of mobile computer devices.

13 Claims, 4 Drawing Sheets

(56) References Cited

U.S. PATENT DOCUMENTS

| | | | |
|---|---|---|---|
| 7,357,329 B2* | 4/2008 | Sakamura et al. | 235/492 |
| 7,395,241 B1* | 7/2008 | Cook | G06Q 20/02 |
| | | | 235/379 |
| 7,464,867 B1* | 12/2008 | Kolls | G06Q 30/06 |
| | | | 235/381 |
| 7,609,406 B2 | 10/2009 | Roth et al. | |
| 7,746,511 B2 | 6/2010 | Hamilton et al. | |
| 7,819,322 B2* | 10/2010 | Hammad et al. | 235/449 |
| 7,853,525 B2* | 12/2010 | Yeates et al. | 705/40 |
| 8,121,942 B2* | 2/2012 | Carlson et al. | 705/39 |
| 8,121,956 B2* | 2/2012 | Carlson et al. | 705/67 |
| 8,151,345 B1* | 4/2012 | Yeager | G06Q 20/367 |
| | | | 235/375 |
| 8,260,719 B2* | 9/2012 | Carrott | 705/64 |
| 8,260,723 B2* | 9/2012 | Carrott | 705/76 |
| 8,261,977 B2* | 9/2012 | Wiesman et al. | 235/380 |
| 8,281,998 B2* | 10/2012 | Tang | G06Q 20/32 |
| | | | 235/380 |
| 8,286,875 B2* | 10/2012 | Tang | G06Q 20/32 |
| | | | 235/380 |
| 8,314,817 B2 | 11/2012 | Williamson et al. | |
| 8,463,713 B2* | 6/2013 | Carrott | 705/76 |
| 8,489,506 B2* | 7/2013 | Hammad et al. | 705/44 |
| 8,494,968 B2* | 7/2013 | Hammad et al. | 705/71 |
| 8,533,118 B2* | 9/2013 | Weller et al. | 705/44 |
| 8,571,937 B2* | 10/2013 | Rose et al. | 705/16 |
| 8,577,803 B2* | 11/2013 | Chatterjee et al. | 705/41 |
| 8,589,291 B2* | 11/2013 | Carlson et al. | 705/39 |
| 8,606,700 B2* | 12/2013 | Carlson et al. | 705/39 |
| 8,825,516 B2 | 9/2014 | Grant et al. | |
| 9,314,472 B2 | 4/2016 | Geus et al. | |
| 2002/0116245 A1* | 8/2002 | Hinkle et al. | 705/8 |
| 2002/0194068 A1* | 12/2002 | Bishop et al. | 705/14 |
| 2003/0137416 A1* | 7/2003 | Fu | G06F 21/86 |
| | | | 340/568.1 |
| 2003/0222152 A1* | 12/2003 | Boley, Jr. | 235/492 |
| 2004/0104268 A1* | 6/2004 | Bailey | G06Q 20/32 |
| | | | 235/439 |
| 2004/0120101 A1* | 6/2004 | Cohen | H01L 23/576 |
| | | | 361/654 |
| 2006/0049243 A1* | 3/2006 | Sakamura et al. | 235/380 |
| 2006/0049256 A1* | 3/2006 | von Mueller | G06F 21/72 |
| | | | 235/449 |
| 2006/0197753 A1 | 9/2006 | Hotelling | |
| 2006/0264110 A1* | 11/2006 | Mambakkam | H01R 27/00 |
| | | | 439/630 |
| 2007/0131774 A1 | 6/2007 | Celestini | |
| 2008/0105747 A1 | 5/2008 | Orlassino | |
| 2008/0257966 A1* | 10/2008 | Britt | G06K 19/005 |
| | | | 235/492 |
| 2009/0068982 A1* | 3/2009 | Chen | G06Q 20/108 |
| | | | 455/407 |
| 2009/0266899 A1 | 10/2009 | Yoshizawa | |
| 2010/0148066 A1 | 6/2010 | Stratmann et al. | |
| 2010/0196075 A1* | 8/2010 | Tredoux | G06Q 20/28 |
| | | | 400/76 |
| 2010/0280909 A1* | 11/2010 | Zhang | G06Q 20/10 |
| | | | 705/17 |
| 2011/0180600 A1 | 7/2011 | Want et al. | |
| 2011/0198395 A1* | 8/2011 | Chen | G06K 7/084 |
| | | | 235/380 |
| 2011/0249104 A1 | 10/2011 | Cardillo et al. | |
| 2011/0279279 A1* | 11/2011 | Mirkazemi-Moud | G06F 1/1626 |
| | | | 340/635 |

* cited by examiner

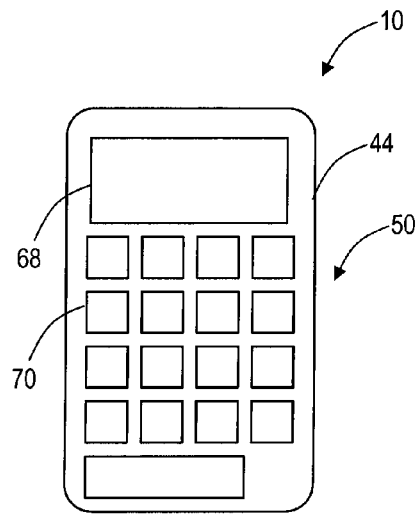
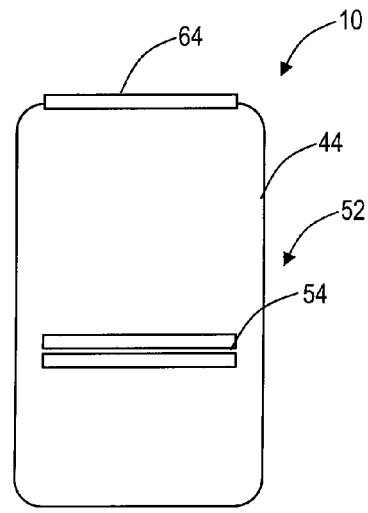
FIG. 2  FIG. 3
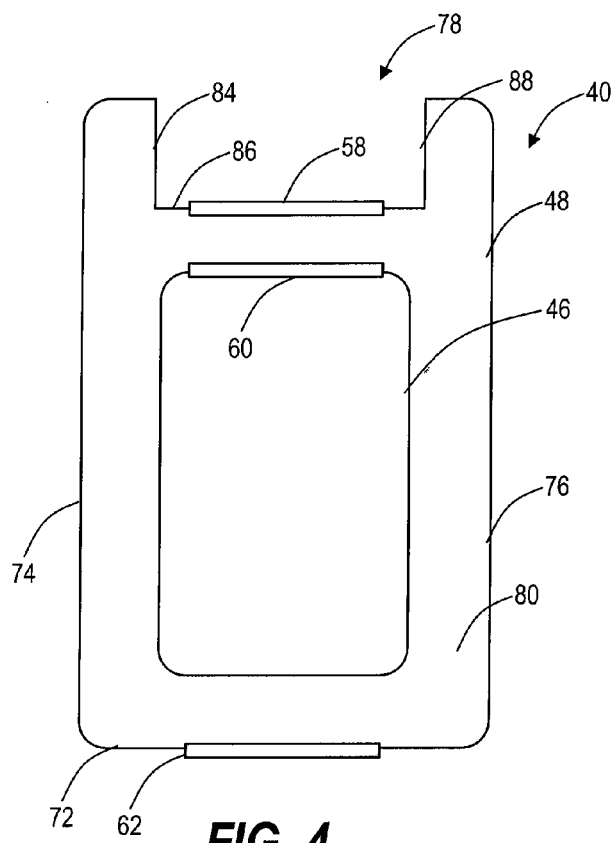
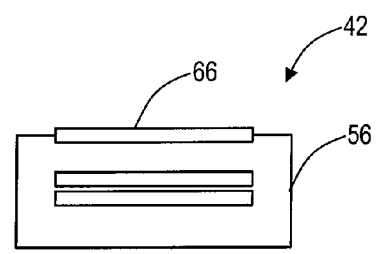
FIG. 4  FIG. 5

UNIVERSAL PAYMENT MODULE SYSTEMS AND METHODS FOR MOBILE COMPUTING DEVICES

FIELD OF THE INVENTION

The present invention relates generally to payment systems and methods with mobile computing devices. More particularly, the present invention relates to universal payment module systems and methods for mobile computing devices that generally include a universal payment module and an associated adapter device to couple the universal payment module to any of a plurality of mobile computing devices.

BACKGROUND OF THE INVENTION

Payment applications are evolving with the proliferation of mobile and fixed computing devices. In general, mobile computing devices include smart phones, cell phones, personal digital assistants (PDAs), and the like. Fixed computing devices may include point-of-sale (POS) devices, wall-mounted scanners, and the like. These devices typically include network connectivity such as through wireless (i.e. cellular, wireless local area network (WLAN)). Conventionally, there are so-called snap-on modules for a particular mobile device that enable the mobile device to obtain payments. As described herein, various mobile or fixed payment applications may include credit card transactions, debit card transactions, chip and PIN transactions, and the like. The conventional snap-on modules are designed to fit only one style of mobile or fixed device, i.e. the form factor is dedicated to one mobile device form factor. Further, all payment devices require special payment security mechanisms via mechanical, electrical, and software mechanisms. Thus, it is not possible to take one particular snap-on module for mobile payments and connect it to a different form factor without reengineering, testing, etc. In addition, payment devices also require payment card industry security approvals (like PCI and EMV) before they can be deployed for use. Since the physical construction and embodiment is usually considered part of the security system any changes usually require a new security review and approval, a time consuming and costly process.

BRIEF SUMMARY OF THE INVENTION

In an exemplary embodiment, a universal payment module system includes a payment module including a housing and a first connector; and one or more adapters including a second connector and a third connector, wherein, for each of the one or more adapters, the second connector is configured to interface with the first connector and the third connector is configured to interface to one of a plurality of computing devices associated with the each of the one or more adapters; wherein the payment module is configured to process mobile payment transactions and to communicate between the one of the plurality of computing devices, and wherein the payment module is configured to operate with each of the plurality of computing devices via the one or more adapters. Optionally, the one or more adapters each may further include a fourth connector; and the universal payment module system may further include a card reading device including a fifth connector configured to interface with the fourth connector, wherein the card reading device may be configured to read any of a credit card, debit card, contactless card, ATM card, or smart card. The payment module may include a front portion and a rear portion, the front portion may include input and output interfaces. The rear portion may include a card reading device, wherein the card reading device may be configured to read any of a credit card, debit card, contactless card, ATM card, or smart card. The payment module may be configured to connect to or within a housing of each of the one or more adapters, and wherein the payment module may be configured to connect to the each of the one or more adapters such that the front portion and the rear portion are accessible by a user. The payment module may be configured to connect to or within a housing of each of the one or more adapters, wherein the each of the one or more adapters is configured to connect to a computing device, and wherein the each of the one or more adapters may provide a power and data interface between the computing device and the payment module. The payment module may be tested for compliance to regulatory standards, and wherein the one or more adapters may not require compliance testing to the regulatory standards. Optionally, each of the one or more adapters may include a form factor based on an associated computing device, wherein the payment module may include a single form factor thereby allowing the payment module to be utilized in conjunction with the plurality of computing devices. The housing of the payment module may include tamper resistance mechanisms. The tamper resistance mechanisms may include one or more sensors disposed in the housing configured to deactivate the payment module responsive to detecting tampering of the housing. The payment module may include a processor, a data store, memory, and input and output interfaces, each of which is communicatively coupled via a local interface that is communicatively coupled to the second connector. The payment module may be configured to: receive payment information; process the payment information into a payment transaction; and communicate the payment transaction via an attached adapter to a computing device. The payment information may be received from any of a magnetic stripe reader disposed on the payment module, a magnetic stripe reader connected to the adapter, the input and output interfaces on the payment module, and a contactless connection. The payment information may be processed into encrypted data for the payment transaction, and wherein the encrypted data may be communicated to the computing device. The computing device may include a network connection, and wherein the encrypted data may be transmitted over the network connection.

In another exemplary embodiment, a payment device includes a processor; input/output interfaces; a data store; one or more sensors; memory; an external connector; a local interface communicatively coupling the processor, the input/output interfaces, the data store, the one or more sensors, the memory, and the external connector; and a housing including the processor, the input/output interfaces, the data store, the one or more sensors, the memory, and the external connector; wherein the housing is configured to connect to an external adapter via the external connector for operation with a device associated with the external adapter; and wherein the processor, the input/output interfaces, the data store, the one or more sensors, the memory, and the external connector collectively are configured to enable payment transaction processing.

In yet another exemplary embodiment, a mobile payment method with a device includes providing a universal payment module configured to process mobile payment transactions; providing a device and an associated adapter configured to interface the universal payment module with the device; connecting the universal payment module to the adapter; connecting the adapter to the device; utilizing the universal payment module to process a payment transaction; and communicating the payment transaction over a network via the device. The mobile payment method may further include ensuring compliance of the universal payment module to regulations related to any of credit card processing and debit card processing. The mobile payment method may further include providing a plurality of mobile devices; providing a plurality of adapters for each of the plurality of mobile devices; and connecting the universal payment module to any of the plurality of adapters for use with any of the plurality of mobile devices.

BRIEF DESCRIPTION OF THE DRAWINGS

The present invention is illustrated and described herein with reference to the various drawings of exemplary embodiments, in which like reference numbers denote like method steps and/or system components, respectively, and in which:

FIG. 2 is a front view of the universal payment module;

FIG. 3 is a rear view of the universal payment module;

FIG. 4 is a front view of an adapter configured to connect the universal payment module to a mobile computing device;

FIG. 5 is a front view of a snap-on magnetic stripe reader for connection to the adapter;

DETAILED DESCRIPTION OF THE INVENTION

In various exemplary embodiments, the present invention provides universal payment module systems and methods for mobile or fixed computing devices that include a universal payment module and an associated adapter device for coupling the universal payment module to any of a plurality of mobile computing devices or fixed computing devices, such as wall mounted price checkers. The present invention utilizes a common payment module (e.g., card industry approved) which can interface multiple mobile computers with differing form factors via a snap-on sled. Advantageously, the present invention allows the leveraging of one payment module for many mobile computers. The single payment module includes various special payment security mechanisms via mechanical, electrical, and software mechanisms. The present invention enables design, standardization, and production of one single common, payment card industry approved, universal payment module for a plurality of mobile computer devices instead of one specific payment module for each form factor of the plurality of mobile or fixed computing devices.

Figure 1:
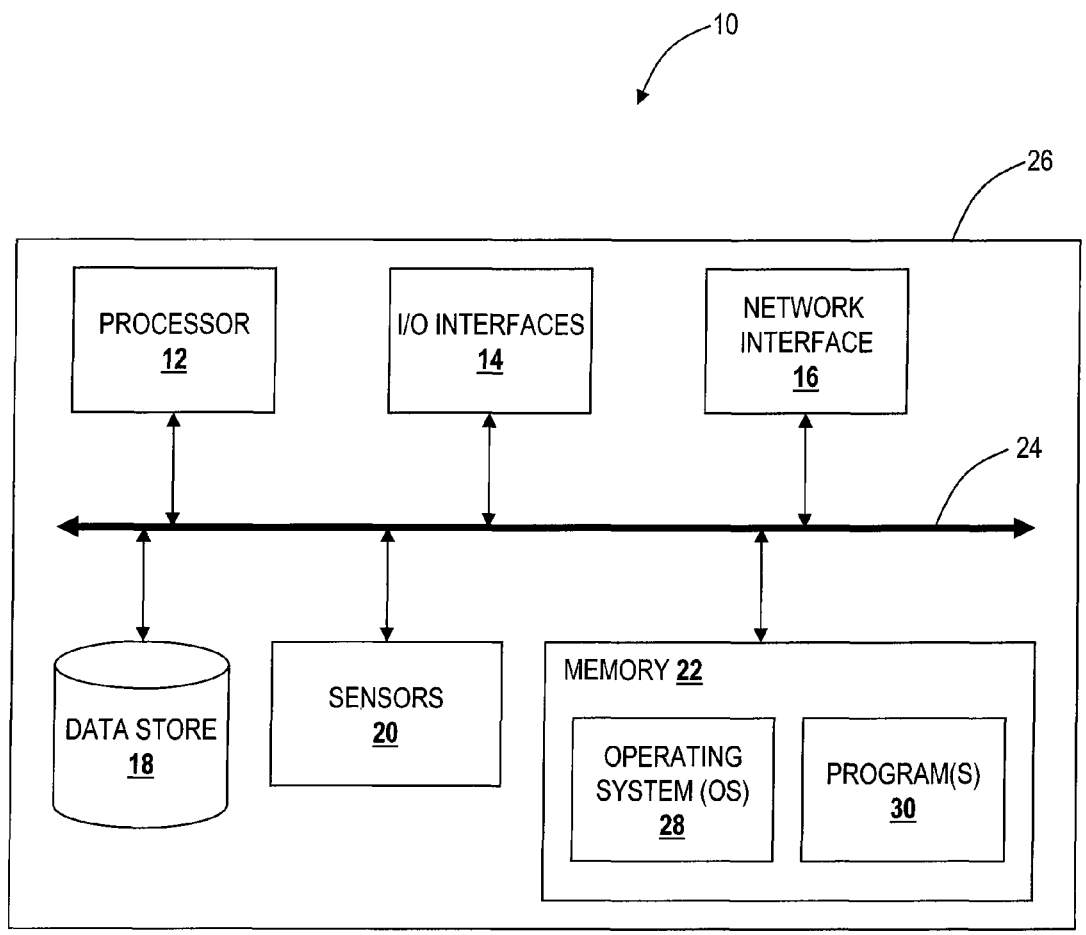
FIG. 1 is a block diagram of a universal payment module illustrating various components configured for receiving and processing payments.

Referring to FIG. 1, in an exemplary embodiment, the present invention includes a universal payment module 10 with various components configured for receiving and processing payments. The universal payment module 10 may be a digital device that, in terms of hardware architecture, generally includes a processor 12, input/output (I/O) interfaces 14, a network interface 16, a data store 18, various sensors 20, and memory 22. It should be appreciated by those of ordinary skill in the art that the block diagram in FIG. 1 depicts the universal payment module 10 in an oversimplified manner, and a practical embodiment may include additional components and suitably configured processing logic to support known or conventional operating features that are not described in detail herein. The components (12, 14, 16, 18, 20, and 22) are communicatively coupled via a local interface 24 and housed collectively in a housing 26. The local interface 24 may be, for example but not limited to, one or more buses or other wired or wireless connections, as is known in the art. The local interface 24 may have additional elements, which are omitted for simplicity, such as controllers, buffers (caches), drivers, repeaters, and receivers, among many others, to enable communications. Further, the local interface 24 may include address, control, and/or data connections to enable appropriate communications among the aforementioned components.

The processor 12 is a hardware device for executing software instructions. The processor 12 may be any custom made or commercially available processor, a central processing unit (CPU), an auxiliary processor among several processors associated with the universal payment module 10, a semiconductor-based microprocessor (in the form of a microchip or chip set), or generally any device for executing software instructions. When the universal payment module 10 is in operation, the processor 12 is configured to execute software stored within the memory 22, to communicate data to and from the memory 22, and to generally control operations of the universal payment module 10 pursuant to the software instructions. The I/O interfaces 14 may be used to receive user input from and/or for providing system output to one or more devices or components. User input can be provided via, for example, a keyboard, a keypad, a mouse, a scroll bar, buttons, bar code scanner, and the like. System output can be provided via a display device such as a liquid crystal display (LCD), touch screen, and the like. The I/O interfaces 14 can also include, for example, a serial port, a parallel port, a small computer system interface (SCSI), an infrared (IR) interface, a radio frequency (RF) interface, and/or a universal serial bus (USB) interface. In an exemplary embodiment, the I/O interfaces 14 may include a graphical user interface (GUI), a keypad, a magnetic strip reader, an RFID chip reader, and the like that enables a user to interact with the universal payment module 10. Additionally, the I/O interfaces 14 may include connectors to interface data between the universal payment module 10, an adapter, and a mobile or fixed computing device. For example, the universal payment module 10 may plug into the adapter which in turn snaps on to the mobile or fixed computing device. There may be a plurality of different adapters each for a plurality of different mobile or fixed computing devices.

The network interface 16 is used to enable the universal payment module 10 to communicate on a network or on the network through a corresponding mobile or fixed computing device. The network interface 16 may include, for example, an Ethernet adapter (e.g., 10BaseT, Fast Ethernet, Gigabit Ethernet) or a wireless local area network (WLAN) adapter (e.g., 802.11a/b/g/n or proprietary wireless protocol based, including mesh network) or a cellular data network (e.g., 3G or EvDO) adapter. The network interface 16 may include address, control, and/or data connections to enable appropriate communications on the network and/or to the corresponding mobile or fixed computing device. In an exemplary embodiment, the network interface 16 includes circuitry and logic to interface to the different adapters for communication of data. Further, the mobile or fixed computing device may include another network adapter, such as a radio to enable wireless communication to an external access device or network. Any number of suitable wireless data communication protocols, techniques, or methodologies can be supported by the radio, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. Note, the universal payment module 10 may utilize the radio on the mobile or fixed computing device to communicate payments over a network.

The data store 18 may be used to store data. The data store 18 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 18 can incorporate electronic, magnetic, optical, and/or other types of storage media. The memory 22 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 22 may incorporate electronic, magnetic, optical, and/or other types of storage media. Note that the memory 22 may have a distributed architecture, where various components are situated remotely from one another, but can be accessed by the processor 12. The software in memory 22 may include one or more software programs, each of which includes an ordered listing of executable instructions for implementing logical functions. In the example of FIG. 1, the software in the memory system 22 includes a suitable operating system (O/S) 28 and programs 30. The operating system 28 essentially controls the execution of other computer programs, and provides scheduling, input-output control, file and data management, memory management, and communication control and related services. Collectively, the operating system 28 and the programs 30 are configured to support payments using the universal payment module 10 including taking of payments, processing of payments, and communication of payments to/from a corresponding mobile or fixed computing device.

As described herein, the various components (12, 14, 16, 18, 20, and 22) are contained or disposed within or on the housing 26. The housing 26 includes a specific form factor and the sensors 20 are disposed within this form factor. In particular, the universal payment module 10 must meet certain regulatory specifications such as, for example, Payment Card Industry (PCI) specifications, Europay Mastercard Visa (EMV), INTERAC, and the like. Advantageously, the present invention enables the universal payment module 10 with the housing 26 to operate as a single form factor, payment regulatory body approved device that can interface with multiple mobile or fixed computers via an adapter. Of note, the development and compliance requirements for payment devices are lengthy and costly. The present invention provides the ability to create one module (i.e., the universal payment module 10 with the housing 26) to work with many mobile or fixed computers allows leveraging one product to many and avoiding additional expenses. Companion adapter sleds allow the adaption of the universal payment module 10 to the various mobile or fixed computers. The sensors 20 are disposed within the housing 26 and configured to prevent users from accessing the various components within the universal payment module 10. This is a requirement for compliance and security to ensure tamper resistance in the universal payment module 10. The sensors 20 are customized to the particular form factor of the housing 26.

The programs 28 provide a user interface, payment collection, payment processing, and communications to/from the adapter and the mobile or fixed computing device. In general, the programs 28 for the universal payment module 10 enable various payment applications including, for example, Point of Sale (POS) applications, processing of cards with magnetic stripes, processing of cards with smart chips, processing of cards with RFID, integrated payment transaction processing, and the like. The programs 28 along with the various other components of the universal payment module 10 provide payment security compliant with various specifications includes firewall, intrusion prevention, enforced authentication, data encryption, integrity monitoring, ability to wipe data on the universal payment module 10 if lost or stolen, and the like. In an exemplary embodiment, the programs 28 include algorithms to process credit card or debit card transactions remotely (POS) applications from the universal payment module 10. This may include security and encryption to take card data and process a transaction and to send the processed transaction to a remote server or the like.

Referring to FIGS. 2-5, in various exemplary embodiments, an exemplary physical implementation of the universal payment module 10 and an associated adapter 40 is illustrated. FIG. 2 illustrates a front view of the universal payment module 10 and FIG. 3 illustrates a rear view of the universal payment module 10. FIG. 4 illustrates a front view of the adapter 40, and FIG. 5 illustrates a snap-on magnetic stripe reader 42 for connection to the adapter 40. As described herein, the universal payment module 10 is a single form factor device that may interconnect with a plurality of different mobile or fixed computing devices with varying form factors. The adapter 40 is configured to interface the universal payment module 10 to multiple mobile or fixed computing devices, e.g. the adapter 40 may function as a snap-on interfacing sled leveraging the universal payment module 10 to many mobile or fixed computing devices. Thus, the universal payment module 10 is a single form factor, payment regulatory body approved device that can interface with multiple mobile or fixed computing devices. As described herein, the development and compliance requirements for payment devices such as the universal payment module 10 is lengthy and costly. In one exemplary aspect, the present invention provides the ability to create one module to work with many mobile or fixed computing devices leveraging one product to many and avoiding additional expenses. The adapter 40 may come in various different form factors to allow the adaption of the universal payment module 10 to the various mobile or fixed computing devices. Of note, the adapter 40 does not have the same development and compliance requirements and thus may be easily produced to fit a specific interface and form factor.

The universal payment module 10 includes a housing 44 that is adapted and sized to fit within an opening 46 defined in a housing 48 of the adapter 40. In one exemplary embodiment, the opening 46 extends through the housing 48 allowing a front portion 50 and a rear portion 52 of the universal payment module 10 to be exposed and accessible. In another exemplary embodiment, the opening 46 does not extend through the housing 48, i.e. the opening 46 is a cavity defined in the housing 48, allowing only the front portion to be exposed and accessible. The opening 46 is designed as such based on whether access is required to the rear portion 52. For example, in some exemplary embodiments, the rear portion 52 may include input/output interfaces such as a magnetic stripe reader 54 or the like. Here, the opening 46 is required to provide access to both the portions 50, 52. Where the rear portion 52 is not exposed, additional input/output interfaces such as the magnetic stripe reader 42 may be contained in a separate housing 56 that connects to the adapter 40. The universal payment module 10, the adapter 40, and the magnetic stripe reader 42 may each include a plurality of input/output (IO) interface connectors configured to interconnect these devices 10, 40, 42 physically and electrically. For example, the adapter 40 may include three IO connectors 58, 60, 62.

The connector 58 is configured to connect the adapter 40 to a corresponding mobile or fixed computing device (not shown). This connector 58 may be utilized to provide power and data between the adapter 40 and the corresponding mobile or fixed computing device. The connector 60 is configured to connect the adapter 40 to the universal payment module 10 through a corresponding IO connector 64 on the universal payment module 10. Similar to the connector 58, the connector 60 may be utilized to provide power and data between the adapter 40 and the universal payment module 10. The connector 62 is configured to connect the adapter 40 to an external device such as a connector 66 on the magnetic stripe reader 42. Similar to the connectors 58, 60, the connector 62 may be utilized to provide power and data between the adapter 40 and the external device. With respect to the various connectors 58-66, these connectors may be configured to provide power and data interfaces. Of note, the universal payment module 10 is configured to perform payment processing and data encryption such that payment information exchanged over the data interfaces associated with the connectors 58-66 is encrypted. Thus, all payment operations that must be performed to be compliant to various specifications are performed internally to the universal payment module 10 with the adapter 40, the magnetic stripe reader 42, etc. not requiring compliance testing and the like.

As described herein, the housing 44 for the universal payment module 10 is a form factor compatible with the opening 46 in the adapter 40. In FIGS. 2-4, the housing 44 is illustrated as a substantially rectangular shape forming a rectangular box with the front portion 50, the rear portion 52, top and bottom sides, and left and right sides. Those of ordinary skill in the art will recognize the present invention contemplates any shape or form factor for the housing 44. The front portion 50 may include a display 68, a plurality of keys 70, and the like (e.g. a scroll bar, touch pad, etc.) that are collectively configured to enable user operation of the universal payment module 10. As described above, the rear portion 52 may or may not include components. In general, the housing 44 includes circuitry, hardware, storage, etc. associated with the functionality of the universal payment module 10, e.g. such as described in FIG. 1. The connector 64 is configured to communicate to/from the various circuitry, hardware, storage, etc for operating the universal payment module 10. Further, the connector 64 is illustrate on the top side of the housing 44, and those of ordinary skill in the art will recognize the connector 64 may be placed anywhere on the housing 44.

The adapter 40 includes the housing 48 in a form factor compatible with as associated mobile or fixed computing device. The present invention contemplates one or more different adapters 40 operating with the universal payment module 10. The universal payment module 10 requires stringent standardization, security, compliance, etc. while the adapter 40 does not. The present invention decouples the design of the universal payment module 10 from the design of associated mobile or fixed computing devices. Thus, all that is required to enable the universal payment module 10 to operate with new mobile or fixed computing devices is an associated adapter 40 configured to interface the universal payment module 10 to the mobile or fixed computing device. The housings 44, 48 may be constructed of plastic or the like and collectively the housings 44, 48 are designed to protect the universal payment module 10 from bumps, drops, etc. while still allowing the tripping of sensitive tamper reaction mechanisms, as required for payment regulations. These sensitive tamper reaction mechanisms are included within the housing 44. The adapter 40 includes various connections, circuits, and the like internal to the housing 48 and configured to connect the various connectors 58, 60, 62.

In the exemplary embodiment of FIG. 4, the adapter 40 includes a rectangular box shape with a bottom side 72, a left side 74, a right side 76, a top side 78, a front side 80, and a rear side (not shown) opposing the front side 80. Those of ordinary skill in the art will recognize the present invention contemplates any shape or form factor for the housing 48. It is expected that the particular form factor of the housing 48 will conform to that of a corresponding mobile or fixed computing device. The opening 46 is shaped to conform to the form factor of the universal payment module 10. The top side 78 includes the connector 58 for connecting the adapter 40 to the mobile or fixed computing device. Additionally, the top side 78 includes a cavity defined by three sides 84, 86, 88. The cavity is configured to engage the mobile or fixed computing device in a snap-on configuration, i.e. the cavity receives a portion of the mobile or fixed computing device and provides physical support between the mobile or fixed computing device and the adapter 40. The sides 84, 86, 88 may include snaps, grooves, notches, etc. configured to engage corresponding structures on the mobile or fixed computing device to provide the snap-on configuration.

Figure 6:
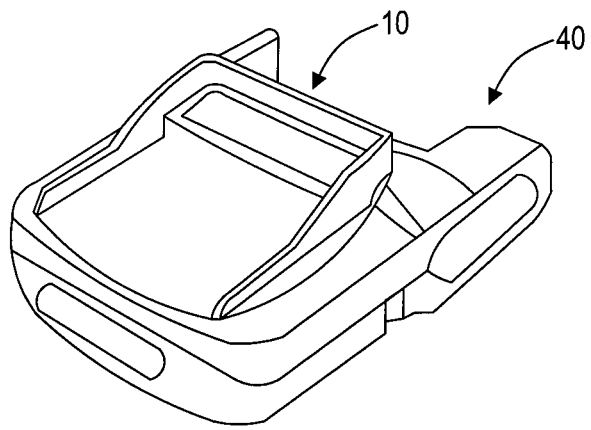
FIG. 6 is a perspective view of the universal payment module connected within an exemplary adapter.
Figure 7:
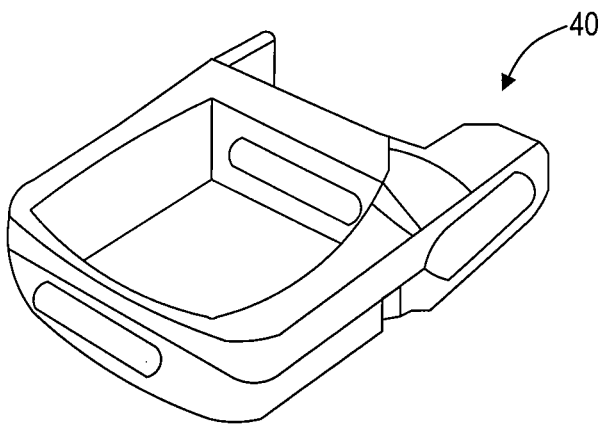
FIG. 7 is a perspective view of the exemplary adapter of FIG. 6 without the universal payment module.
Figure 8:
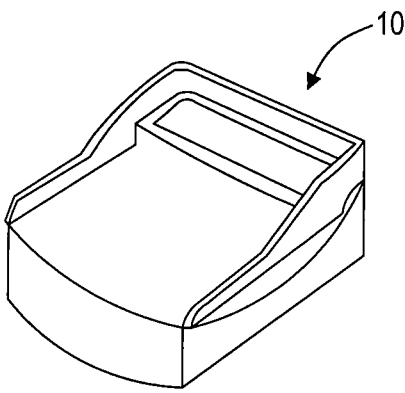
FIG. 8 is a perspective view of the universal payment module of FIG. 6 disconnected from an adapter.

Referring to FIGS. 6, 7, and 8, in various exemplary embodiments, perspective views illustrate an exemplary implementation of the universal payment module 10 and the adapter 40. FIG. 6 is a perspective view of the universal payment module 10 connected within an exemplary adapter 40, FIG. 7 is a perspective view of the exemplary adapter 40 of FIG. 6 without the universal payment module, and FIG. 8 is a perspective view of the universal payment module 10 of FIG. 6 disconnected from the adapter 40. As shown in these exemplary implementations, the adapter 40 includes a specific form factor, and the universal payment module 10 is configured to plug into the adapter 40 thereby enabling operation with any mobile or fixed device configured to snap on or connect to the adapter 40.

Figure 9:
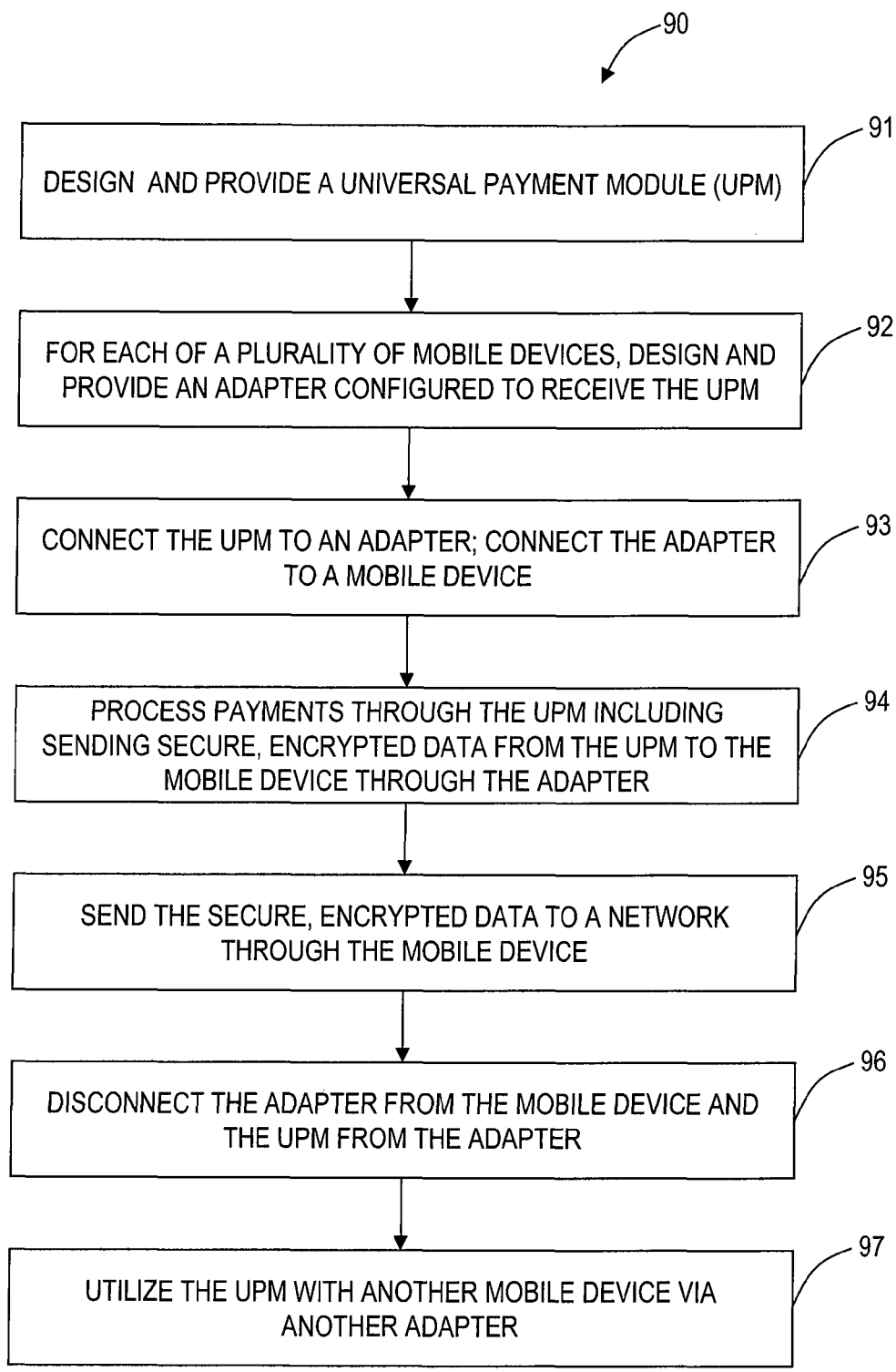
FIG. 9 is a flowchart of an exemplary method for providing and operating a universal payment module with a plurality of mobile computing devices.

Referring to FIG. 9, in an exemplary embodiment, a flowchart illustrates an exemplary method 90 for providing and operating a universal payment module with a plurality of mobile or fixed computing devices. As described herein, the present invention enables the use of a single form factor universal payment module configured to process payments. The method 900 describes both a design/production process and a operational process for the universal payment module. Among several advantages, the present invention streamlines design, testing, and production of payment modules as only one universal payment module is required for multiple mobile or fixed devices. This reduces development, testing, and compliance time and effort. Further, this reduces manufacturing and inventory efforts as well. Once in use, the universal payment module further provides an advantage of reducing the number of components an enterprise or the like needs to provide payments, i.e. only one universal payment module is required even if the enterprise uses a plurality of different mobile or fixed devices—the enterprise simply requires associated adapters for each of the plurality of different mobile or fixed devices. For personal use, the adapter and the universal payment module enable the universal payment module to work across different vendor's platforms.

First, a universal payment module (UPM) is designed and provided (step 91). As described herein, the UPM is configured to provide payment transactions, i.e. POS, including credit card processing, debit card processing, ATM card processing, smart card processing, contactless device processing, and the like. Of note, the UPM is designed and tested for compliance to various standards and regulations associated with these mobile payment transactions. For example, debit card payments must comply with PCI regulations. Advantageously, the present invention allows a payment device vendor to only have to submit to testing and compliance for one single device, i.e. the universal payment module. Further, the UPM is then manufactured and provided to end users or the like. For each of a plurality of mobile or fixed devices intending on using the UPM, an adapter is designed and provided with the adapter configured to receive the UPM (step 92). As described herein, the adapter includes a form factor and associated connectors for each of the different plurality of mobile or fixed devices. That is, the UPM is designed for all mobile or fixed devices as one unit, and each mobile or fixed device has an associated adapter that is configured to receive the UPM and interface the UPM to the mobile or fixed device. Specifically, the adapter interfaces power and data connections from the UPM to the mobile or fixed device. Note, the adapter does not perform payment transaction processing, so it does not require the rigorous testing and compliance requirements of the UPM. Rather, the adapter is configured to interface with already processed transaction data that may be encrypted.

Once the UPM, a mobile or fixed device, and an associated adapter for the UPM to the mobile device are provided, the method 90 may operate these devices by connecting the UPM to the adapter and connecting the adapter to the mobile or fixed device (step 93). In operation, the UPM is configured to snap into or equivalent into, on, etc. the adapter for a physical connection, a data connection, and a power connection. Correspondingly, the adapter is configured to snap on or equivalent to the mobile or fixed device for a physical connection, a data connection, and a power connection. Once the UPM is connected to the adapter and the adapter is connected to the mobile or fixed device, there is a data and a power connection between the mobile or fixed device and the UPM. Thus, the UPM may process payments including sending secure, encrypted data between the UPM and the mobile or fixed device via the adapter (step 94). Here, the UPM is configured to operate as a payment device as described herein, and the UPM is in communication with the mobile or fixed device. For example, the mobile or fixed device may be configured to send the secure, encrypted data to a network, such as a cellular network, a wireless local area network (WLAN), a wide area network (WAN), a private network, the Internet, or the like (step 95). When finished using the UPM with the connected mobile or fixed device, a user may disconnect the adapter from the mobile or fixed device and the UPM from the adapter (step 96). Further, the same UPM may be used with another mobile or fixed device via another adapter (step 97).

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A universal payment module system, comprising:
a plurality of adapters; and
a payment module comprising a payment module housing and a first connector on the payment module housing, the payment module housing being of a first specific form factor and the first connector being configured to connect the payment module to the plurality of adapters, each of the plurality of adapters comprising:
a second connector on an adapter housing adjacent to an opening defined in the adapter housing, the second connector configured to interface with the first connector when the payment module housing is received within the opening;
an engagement portion comprising a cavity defined by three sides of the adapter housing, configured to removably engage one of a plurality of computing devices; each one of the plurality of computing devices having a form factor different from the form factor of the others of the plurality of computing devices; the engagement portion having a shape compatible with the form factor of the one of the plurality of computing devices; and
a third connector on the adapter housing adjacent to the engagement portion, the third connector configured to interface with the one of the plurality of computing devices when the one of the plurality of computing devices is engaged with the engagement portion;
the payment module being configured to process mobile payment transactions and to operate with each of the plurality of computing devices via one of the plurality of adapters when tampering of the payment module housing is undetected, and the payment module being deactivated when tampering of the payment module housing is detected by a sensor in the payment module housing.

2. The universal payment module system of claim 1, wherein each of the plurality of adapters further comprises a fourth connector; and the universal payment module system further comprising:
a card reading device comprising a fifth connector configured to interface with the fourth connector, wherein the card reading device is configured to read any of a credit card, debit card, contactless card, ATM card, or smart card.

3. The universal payment module system of claim 1, wherein the payment module housing comprises a front portion and a rear portion, the front portion comprises input and output interfaces.

4. The universal payment module system of claim 3, wherein the rear, side, or front portion comprises a card reading device, wherein the card reading device is configured to read any of a credit card, debit card, contactless card, ATM card, or smart card.

5. The universal payment module system of claim 4, wherein the front portion and the rear portion are accessible by the user via the opening.

6. The universal payment module system of claim 1, wherein each of the plurality of adapters provides a power and data interface between the computing device and the payment module.

7. The universal payment module system of claim 1, wherein the payment module housing comprises tamper resistance mechanisms.

8. The universal payment module system of claim 1, wherein the payment module comprises a processor, a data store, memory, and input and output interfaces, each of which is communicatively coupled via a local interface within the payment module housing that is communicatively coupled to the first connector.

9. The universal payment module system of claim 8, wherein the payment module is configured to:

receive payment information from at least one of a magnetic stripe reader disposed on the payment module, a magnetic stripe reader connected to the adapter, the input and output interfaces on the payment module, and a contactless connection;

process the payment information into encrypted data for a payment transaction; and communicate the payment transaction via an attached one of the plurality of adapters to one of the plurality of computing devices.

10. The universal payment module system of claim 9, wherein the one of the plurality of computing devices comprises a network connection, and wherein the encrypted data is transmitted over the network connection.

11. The universal payment module system of claim 1 configured to perform payment processing and data encryption such that payment information exchanged over the first connector, the second connector and the third connector is encrypted.

12. The universal payment module system of claim 1 wherein the one of the plurality of computing devices is received via a snap-on connection in the cavity.

13. The universal payment module system of claim 1, wherein each of the plurality of adapters is configured to receive the payment module housing within the opening via a snap-on connection.

* * * * *